United States Patent [19]

Nakayama et al.

[11] Patent Number: 4,699,847
[45] Date of Patent: Oct. 13, 1987

[54] MAGNETIC RECORDING MEDIUM

[75] Inventors: Masatoshi Nakayama; Haruyuki Morita; Yuichi Kubota; Keiko Tsuchiya, all of Tokyo, Japan

[73] Assignee: TDK Corporation, Tokyo, Japan

[21] Appl. No.: 758,434

[22] Filed: Jul. 24, 1985

[30] Foreign Application Priority Data

Aug. 4, 1984 [JP] Japan .................................. 59-164010

[51] Int. Cl.$^4$ ............................................. G11B 5/702
[52] U.S. Cl. ...................................... 428/522; 427/39;
427/40; 427/44; 427/128; 427/129; 427/131;
428/694; 428/900; 428/483
[58] Field of Search ............... 428/480, 694, 900, 695,
428/522, 483; 427/40, 44, 39, 129, 131, 132,
128; 360/134–136

[56] References Cited

U.S. PATENT DOCUMENTS

| 3,639,134 | 2/1972 | Stegmeiier | 427/40 |
| 3,898,952 | 8/1975 | Shirahata | 427/40 |
| 4,210,703 | 7/1980 | Scantlin et al. | 428/900 |
| 4,220,117 | 9/1980 | Shinohara | 427/132 |
| 4,250,225 | 2/1981 | Shirahata et al. | 428/900 |
| 4,260,466 | 4/1981 | Shirahata | 427/35 |
| 4,323,629 | 4/1982 | Kunieda | 428/457 |
| 4,337,279 | 6/1982 | Bolak | 427/40 |
| 4,407,853 | 10/1983 | Okita | 427/44 |
| 4,418,126 | 11/1983 | Izumi | 428/492 |
| 4,429,024 | 1/1984 | Ueno et al. | 428/900 |
| 4,448,846 | 5/1984 | Chang et al. | 428/900 |
| 4,450,186 | 5/1984 | Shinohara | 428/900 |
| 4,472,467 | 9/1984 | Tamaki | 428/900 |
| 4,511,629 | 4/1985 | Konno | 428/522 |
| 4,548,864 | 10/1985 | Nakayama | 428/900 |
| 4,575,475 | 3/1986 | Nakayama | 428/900 |

FOREIGN PATENT DOCUMENTS

| 124119 | 9/1981 | Japan . |
| 57-42889 | 11/1982 | Japan . |
| 58-77030 | 10/1983 | Japan . |
| WO81/02646 | 9/1981 | PCT Int'Appl. . |
| 971433 | 9/1964 | United Kingdom . |
| 2128502 | 2/1984 | United Kingdom . |

Primary Examiner—Ellis P. Robinson
Attorney, Agent, or Firm—Oblon, Fisher, Spivak, McClelland, & Maier

[57] ABSTRACT

In a magnetic recording medium comprising a plastic base film and a magnetic layer, the base film is plasma treated at frequencies in the range of 10 kHz to 200 kHz in an inorganic gas containing at least 5% of oxygen. The magnetic layer is formed on the plasma treated base film by applying a magnetic composition of ferromagnetic fine particles dispersed in a plasticized binder compound comprising a radiation-sensitive modified resin in admixture with a radiation-sensitive modified flexible resin or prepolymer, oligomer or telomer thereof, and exposing the composition to radiation for crosslinking and polymerization.

7 Claims, 6 Drawing Figures

MAGNETIC RECORDING MEDIUM

BACKGROUND OF THE INVENTION

This invention relates to magnetic recording media, and more particularly, to magnetic recording media of coating type using radiation-curable or polymerizable binder.

Several decades have passed since the appearance of magnetic recording media comprising a nonmagnetic substrate and a magnetic layer primarily formed from a magnetic powder of oxide type such as gamma-$Fe_2O_3$, gamma-$Fe_3O_4$ and cobalt-impregnated gamma-$Fe_2O_3$ and a binder. Recently, for the purpose of further improving recording density, magnetic recording media comprising a magnetic layer formed from a ferromagnetic powder such as Fe, Co, Ni, Fe-Co, Co-Ni, Fe-Co-Ni, Fe-Co-B, Fe-Co-Cr-B, Mn-Bi, Mn-Al, Fe-Co-V, etc. and a binder were developed and is now of great interest in the art.

The prior art used thermosetting binders for binding such ferromagnetic fine particles into a magnetic layer. The use of thermosetting binders, however, is rather limited in accomplishing a more efficient and automatic production line as well as increasing the recording density of magnetic recording media.

To overcome the drawbacks of thermosetting binders, Japanese Patent Application Kokai No. 56-124119 proposes a magnetic recording medium having a magnetic layer of magnetic particles bound in a binder capable of curing or polymerizing upon exposure to radiation. Reliable high performance magnetic recording tapes having excellent electromagnetic properties and mechanical properties can be made by combining a binder capable of curing or polymerizing upon exposure to radiation with cobaltmodified needle iron oxide useful in high density recording applications and optionally, needle alloy fine particles having a high coercive force. These tapes find their use in high bias hi-fi audio cassette tape, video cassette tape, and video tape contact-transfer-printing master tape.

These magnetic recording media, particularly for use as magnetic tape and magnetic discs, must fulfil a number of requirements including low dynamic coefficient of friction, smooth and stable travel performance for a prolonged period, improved wear resistance, stability under storage environment to ensure consistent reproduction, and durability (durability of tape both during normal operation and in the still mode). These problems will also be encountered in magnetic recording media having a magnetic recording layer using a radiation-curable or polymerizable binder.

A variety of pre-treatments have heretofore been made on various base films for the purpose of improving durability. Such pre-treatments include treatments with chemical solution, coating, corona discharge treatment, and the like. Wet treatments like chemical solution treatments and coating applied to base films as pre-treatments give rise to a problem when a magnetic composition of magnetic fine particles dispersed in a radiation-curable or polymerizable binder is subseuqently applied to the base film. The binder can interact with the wet treating agent used.

The corona discharge treatment is advantageous because of dry nature eliminating the need for additional steps of rinsing, drying, and disposal of spent liquid. Corona treatment has been carried out for many years and is effective in improving adhesion, wettability, and printability. The corona treatment, however, is not succesful in improving the properties of magnetic recording media to such an extent as to fulfill the high performance which is imposed on the present day and future magnetic recording media.

Another technique known in the art is a flame treatment which is difficult to apply to magnetic recording media which reguire a high degree of dimensional stability.

Under these circumastances, a proposal is made to treat base films with a plasma. The plasma treatment is a one-step dry process and thus has the advantage that drying and disposal of spent solution are unnecessary and no extra material like binders is consumed. In addition, the plasma treatment enables high speed, continuous production so that it can be readily incorporated in the process of manufacturing magnetic recording media without sacrifying production speed and yield.

One technique for plasma treatment of base films is disclosed in Japanese Patent Publication No. 57-42889 (published on Sept. 11, 1982) wherein a treatment is effected with a plasma having a frequency in the range of radio frequency to microwave using a treating gas of air, oxygen, nitrogen, hydrogen, helium, argon, etc. The radio frequency of 13.56 MHz is only described in this publication.

Also, Japanese Patent Application Kokai No. 58-77030 (laid open on May 10, 1983) descloses a process of plasma treatment by applying an AC current at the commercial frequency between electrodes using a treating gas of oxygen, argon, helium, neon or nitrogen. These plasma treatments are somewhat successful in improving the adhesion of a treated base film to a magnetic layer and hence, the durability of magnetic recording media, but not fully satisfactory in bond strength and durability.

Bond strength and durability are still insufficient for magnetic layers using radiation-curable or polymerizable binders.

SUMMARY OF THE INVENTION

It is, therefore, an object of the present invention to provide a novel and improved magnetic recording medium comprising a plasma treated base film and a magnetic layer formed thereon using a radiation-curable or polymerizable binder and possessing the increased bond strength of magnetic layer to base film and hence, increased durability.

The inventors have found that the adhesion and other properties of base films are significantly improved by treating them with a plasma at a frequency in the range of 10 to 200 kilohertz in a treating gas selected from the group consisting of argon, neon, helium, nitrogen, and hydrogen, and mixtures thereof. Further improvements are achievable using a treating atmosphere of an inorganic gas containing at least 5% by volume of oxygen, for example, argon-oxygen mixtures and air.

According to the present invention, there is provided a magnetic recording medium comprising a base film which has been plasma treated at a frequency in the range of 10 to 200 kilohertz, and a magnetic layer formed thereon from a magnetic composition comprising ferromagnetic fine particles and a plasticized binder compound comprising a radiation-sensitive modified resin in admixture with a radiation-sensitive modified flexible resin or prepolymer, oligomer or telomer thereof. The composition is crosslinked and polymerized by exposure to radiation.

BRIEF DESCRIPTION OF THE DRAWINGS

The above and other objects, features, and advantages of the present invention will be more readily understood by reading the following description taken in conjunction with the accompanying drawings, in which.

DESCRIPTION OF THE PREFERRED EMBODIMENTS

The base films used in the practice of the present invention may be of any desired plastic material as long as it is non-magnetic. Polyesters such as polyethylene terephthalate are generally used although polyimide, polyamide and similar resin films may be used where heat resistance is an important factor. Further, the shape, size, and thickness of base films are not particularly limited as long as they meet the intended application.

According to the present invention, base films are plasma treated on at least one their surface which is to bear a magnetic layer. The plasma treatment is effected by feeding an inorganic gas as the treating gas, ionizing it, and contacting the gas-discharge plasma with the base film, thereby plasma treating the base film surface.

The principle of plasma treatment will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissodiate further atoms and molecules. This chain reaction causes the gas to be instantaneously converted into highly ionized state. This is generally called a plasma. Since gaseous molecules have a less chance of collision with electrons and little absorb energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of chemical reaction such as polymerization while being kept relatively unchanged from the original. Base films are plasma treated under these conditions according to the present invention. The use of a low temperature plasma avoids any thermal influence on base films.

Figure 1:
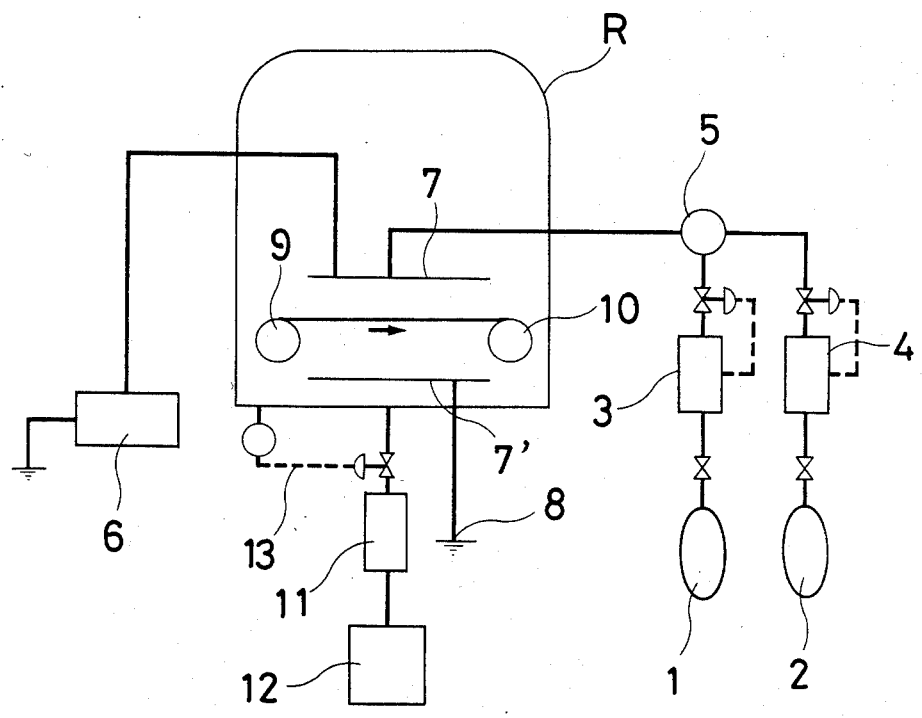
FIG. 1 is a schematic illustration of a plasma treating apparatus having a variable frequency power source.

FIG. 1 illustrates a typical apparatus in which base films on the surface thereof are treated with a plasma. This plasma apparatus uses a variable frequency power source. The apparatus comprises a reactor vessel R into which a treating gas(es) is introduced from a source 1 and/or 2 through a mass folw controller 3 and/or 4. When desired, different gases from the sources 1 and 2 may be mixed in a mixer 5 to introduce a gas mixture into the reactor vessel. he treating gases may be fed at a flow rate of 1 to 250 ml per minute.

Disposed in the reactor vessel R is means for supporting a base film to be treated, in this embodiment, a set of supply and take-up rolls 9 and 10 on which a base film for magnetic tape is wound. Depending on the particular shape of the magnetic recording medium base film to be treated, any desired supporting means may be used, for example, a rotary support apparatus on which the base film rests.

On the opposed sides of the base film to be treated are located a pair of electrodes 7 and 7', one electrode 7 being connected to a variable frequency power source 6 and the other electrode 7' being grounded at 8.

The reactor vessel R is further connected to a vacuum system for evacuating the vessel, including a liquefied nitrogen trap 11, a vacuum pump 12, and a vacuum controller 13. The vacuum system has the capacity of evacuating and keeping the reactor vessel R at a vacuum of 0.01 to 10 Torr.

In operation, the reactor vessel R is first evacuated by means of the vacuum pump 12 to a vacuum of $10^{-3}$ Torr or lower before a treating gas or gases are fed into the vessel at a given flow rate. Then the interior of the reactor vessel is maintained at a vacuum of 0.01 to 10 Torr. A take-up roll motor (not shown) is turned on to transfer the base film to be treated. When the rate of transfer of the base film and the flow rate of the treating gas mixture become constant, the variable frequency power 6 is turned on to generate a plasma with which a travelling base film is treated.

In this plasma treatment, the power source must have a frequency in the range of 10 to 200 kilohertz. Frequencies lower than 10 KHz and higher than 200 KHz result in a reduction in bond strength, and hence, durability imparted to magnetic recording media. It is to be noted that other parameters including supply current and treating time may be as usual or properly selected through experimentation.

In the preferred embodiment of the invention, an inorganic gas containing oxygen is used as the treating gas. The inorganic gas may contain an effective proportion of, preferably 5 to 100% by volume of oxygen. The inorganic gas may be oxygen alone. As the inorganic gas mention may be made of argon, neon, helium, nitrogen, hydrogen and mixtures of two or more of them. It is also contemplated to use air as the oxygen-containing inorganic gas.

In the preferred embodiment of the invention, the adhesion of magnetic layer to base film and hence, the durability of the resultant magnetic tape is substantially improved by controlling the partial pressure of oxygen in the treating atmosphere and the plasma frequency in the specific range. Particularly, the still performance and runnability of magnetic tape are improved.

According to the present invention, a magnetic layer is formed on the thus plasma treated surface of the base film with or without an intervening undercoat layer. The magnetic layer is formed from a magnetic composition comprising ferromagnetic fine particles and a binder compound comprising a radiation-sensitive modified resin combined with a radiation-sensitive modified flexible resin. The radition-sensitive modified resin and the ratiation-sensitive modified flexible resin may be blended in a ratio between 8:2 and 2:8 by weight. The radiation-sensitive modified resins used herein may preferably have a dynamic modulus of at least $1.0 \times 10^9$ dyn/cm$^2$ in a temperature range between 20° C. and 60° C. at 100 Hz prior to modification into radiation sensitive form.

The radiation-sensitive modified flexible resins used herein are solvent-soluble elastomers and designate elastomers having rubber elasticity and softness as synthetic rubber as well as improved adhesion to polyester substrates, and prepolymers, oligomers, and telomers thereof. They may preferably have such kinetic properties as exemplified by a dynamic modulus of less than $1.0 \times 10^9$ dyn/cm$^2$ in a temperature range between 20° and 60° C. at 100 Hz. These thermoplastic solvent-soluble elastomers should be modified into radiation sensitive form such that they produce radicals to form a crosslinked structure upon exposure to radiation as will be described hereinafter.

It is desired that the radiation-sensitive modified plastic component and the elastomeric, prepolymeric, oligomeric or telomeric component be well compatible with each other and with magnetic powder for allowing good dispersion.

Providing a binder capable of forming a three dimensional network structure upon exposure to radiation by combining the radiation-sensitive modified resin with the elastomeric component is effective in maintaining not only the electromagnetic properties of magnetic recording media for use in a variety of applications including audio, video, storage, and measurement applications, but also various physical properties required for magnetic coatings, for example, hardness, flexibility, wear resistance, adequate coefficient of friction, elimination of stick slippage, surface moldability, adhesion to base films, and modulus as well as stability of these properties in various environments covering from low to high temperatures and from low to high humidities.

Some non-limiting examples of the thermoplastic resins which can be modified into radiation-sensitive form are given below.

(a) Vinyl chloride type copolymers

There are included vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate copolymers having OH terminal groups and alkyl pendant groups, for example, VROH, VYNC, VYEGX, VERR, VYES, VMCA, and VAGH (trade names, all manufactured by U.C.C. Corporation).

These copolymers may be modified into radiation-sensitive form by incorporating an acrylic, maleic or allylic double bond therein by a procedure as described in Japanese Patent Application Kokai No. 56-124119.

Particularly when radiation-sensitive modified vinyl chloride copolymers are irradiated at a low dose of less than about 20 Mrad, they generate radicals through an unknown reaction mechanism in addition to those radicals generated from radiation-sensitive functional groups such as acrylic double bonds upon exposure to radiation, forming a crosslinked structure. They are thus very effective as binders for magnetic recording media.

(b) Saturated Polyester Resins

There are included saturated polyester resins prepared by esterification between saturated polybasic acids such as phthalic acid, isophthalic acid, terephthalic acid, succinic acid, adipic acid, sebacic acid, etc. and polyhydric alcohols such as ethylene glycol, diethylene glycol, glycerine, trimethylolpropane, 1,2-propyleneglycol, 1,3-butanediol, dipropylene glycol, 1,4-butanediol, 1,6-hexanediol, pentaerythritol, sorbitol, neopentyl glycol, 1,4-cyclohexane dimethanol, etc., and resins obtained by modifying these resins with sodium sulfite ($Na_2SO_3$) such as Vyron 53S (trade name, manufactured by Toyobo K.K.). These resins may be modified into radiation curable form by a procedure as described above. (c) Unsaturated Polyester Resins There are included unsaturated polyester resins having radiation-sensitive unsaturated double bonds in the molecular chain, for example, those polyester resins prepared by esterification between polybasic acids and polyhydric alcohols, but rendered unsaturated by partially replacing the polybasic acids by maleic acid, including prepolymers and oligomers.

The polybasic acids and polyhydric alcohols from which the saturated polyester resins are prepared may be selected from those members mentioned in (b), and the acids used to incorporate radiation-sensitive unsaturated double bonds may be maleic acid and fumaric acid.

The radiation-curable unsaturated polyester resins may be prepared by adding a double bond-incorporating acid such as maleic acid and fumaric acid to a reaction mixture of at least one polybasic acid and at least one polyhydric alcohol, causing the reaction mixture to react by a conventional process, that is, through water- or alcohol-removing reaction in the presence of a catalyst in a nitrogen atmosphere at 180° to 200° C., then raising the temperature to 240° to 280° C., and effecting condensation reaction in a vacuum of 0.5 to 1 mmHg. The amount of maleic acid and fumaric acid added ranges from 1 to 40 mol%, preferably from 10 to 30 mol% of the acid component in consideration of the degree of crosslinking during preparation and the radiation curing characteristics of the resulting resins.

(d) Polyvinyl Alcohol Resins

There are included polyvinyl alcohol, butyral resins, acetal resins, formal resins, and copolymers thereof. These resins may be modified into radiation curable form by acting on hydroxyl groups contained therein by a procedure as described in Japanese Patent Application Kokai No. 56-124119.

(e) Epoxy Resins and Phenoxy Resins

There are included epoxy resins prepared from bisphenol-A and epichlorohydrin and methyl epichlorohydrin, for example, Epikote 152, 154, 828, 1001, 1004 and 1007 (Shell Chemicals), DEN 431, DER 732, DER 511 and DER 331 (Dow Chemical), Epichlon 400 and 800 (Dai-Nihon Ink K.K.), and highly polymerized ones of the foregoing expoxy resins, for example, phenoxy resins such as PKHA, PKHC and PKHH (U.C.C. Corporation), and copolymers of brominated bisphenol-A with epichlorohydrin such as Epichlon 145, 152, 153 and 1120 (Dai-Nihon Ink K.K.). Also included are derivatives thereof containing carboxylate group. These resins may be modified into radiation sensitive form by making use of epoxy groups contained therein.

(f) Cellulose Derivatives

A variety of cellulose derivatives are useful as the thermoplastic component. Particularly preferred are pyroxylin, cellulose acetobutyrate, ethyl cellulose, butyl cellulose, acetyl cellulose, and the like. These derivatives may be modified into radiation sensitive form by a per se known procedure, for example, by activating hydroxyl groups in the resins.

Other examples of the resins which can be modified into radiation curable form include polyfunctional polyester resins, polyether-ester resins, polyvinyl pyrrolidone resins and derivatives thereof such as PVP-olefin copolymers, polyamide resins, polyimide resins, phenol resins, spiroacetal resins, acrylic resins containing at least one of acrylates and methacrylates having a hydroxyl group as a polymer component, and the like.

(g) Polyether resins

Polyfunctional polyethers are included, for example, polyethers having at least one hydroxyl group such as Adeka Polyether P-700, P-1000, and G-1500 (trade name, manufactured by Asahi Denka K.K.) and Polymeg 100 and 650 (trade name, manufactured by Quaker Coats Company).

(h) Polycaprolactones

Polyfunctional polyesters are included, for example, Polycaprolactone PCP-2000, PCP-0240, and PCP-0300 (trade name, manufactured by Chisso K.K.)

More tough coatings may be obtained by blending the above-mentioned radiation-curable thermoplastic resins with unmodified thermoplastic elastomers or prepolymers. Further advantages are achieved if these elastomers or prepolymers are also modified into radiation curable form. Examples of the thermoplastic elastomers and prepolymers which can be used in combination with the above-mentioned radiation curable resins are shown below.

(i) Polyurethane Elastomers, Prepolymers and Telomers

Polyurethane elastomers are particularly useful among thermoplastic resins because of wear resistance, adhesion to PET films, and affinity to magnetic particles. Examples of the urethane compounds include polyurethane elastomers, prepolymers and telomers of polycondensation products between (i) isocyanates such as toluene-2,4-diisocyanate, toluene-2,6-diisocyanate, xylene-1,3-diisocyanate, xylene-1,4-diisocyanate, naphthalene-1,5-diisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene-1,6-diisocyanate, isophoronediisocyanate, dicyclohexylmethane diisocyanate, and polyfunctional isocyanates such as Desmodur L and Desmodur N (trade name, Bayer A.G.) and (ii) various polyesters such as linear saturated polyesters prepared through polycondensation of polyhydric alcohols such as ethylene glycol, diethylene glycol, glycerine, trimethylol propane, 1,4-butanediol, 1,6-hexanediol, pentaerythrytol, sorbitol, neopentylglycol, 1,4-cyclohexanedimethanol, etc. with saturated polybasic acids such as phthalic acid, isophthalic acid, terephthalic acid, succinic acid, adipic acid, sebacic acid, etc.; linear saturated polyethers such as polyethylene glycol, polypropylene glycol, and polytetramethylene glycol; caprolactam; hydroxyl-containing acrylates and hydroxyl-containing methacrylates, and the like. These elastomers, prepolymers and telomers may be combined with the radiation-sensitive modified thermoplastic resins. Further advantages are obtained by reacting the urethane elastomers with monomers having acrylic or allylic double bonds capable of reacting with terminal isocyanate or hydroxyl groups of the elastomers, thereby modifying the elastomers into radiation sensitive form.

(j) Acrylonitrile-Butadiene Copolymerized Elastomers

There are included acrylonitrile-butadiene copolymer prepolymers having terminal hydroxyl groups such as Poly BD Liquid Resin (trade name, Sinclair Petrochemical Company) and such elastomers as Hycar 1432J (trade name, Nihon Zeon K.K.) are useful as elastomers capable of crosslinking and polymerization because double bonds in the butadiene moiety generate radicals upon exposure to radiation.

(k) Polybutadiene Elastomers

Low molecular weight butadiene prepolymers having terminal hydroxyl groups such as Poly BD Liquid Resin R-15 (trade neme, Sinclair Petrochemical Company) are useful particularly because of their compatibility with thermoplastic resins and affinity to magnetic powder. Since R-15 prepolymer has a hydroxyl group at either end of its molecule, it can be rendered more radiation sensitive by adding an acrylic unsaturated double bond to the molecule end. It is then more advantageous as the binder.

Cyclized polybutadienes such as CBR M 901 (trade name, Nihon Synthetic Rubber K.K.) also exhibit improved performance when combined with thermoplastic resins. They are very useful as the binder because unsaturated bonds inherently contained in the polybutadiene create radicals upon exposure to radiation to promote crosslinking and polymerization.

Other examples of the preferred thermoplastic elastomers and prepolymers include styrene-butadiene rubbers, chlorinated rubbers, acrylic rubbers, isoprene rubbers, and cyclized products thereof such as CIR 701 (trade name, Nihon Synthetic Rubber K.K.), epoxy-modified rubbers, internally plasticized saturated linear polyesters such as Vyron #300 (trade name, Toyobo K.K.), and the like. They may be effectively utilized by modifying them into radiation sensitive form.

Illustrative radiation-curable resins are themoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing upon exposure to radiation may also be used.

More illustratively, radiation sensitive modification may be carried out by any of the following procedures.

(A) Radiation sensitive modified resins may be prepared by reacting one molecule of a thermoplastic resin or thermoplastic elastomer or prepolymer having at least two hydroxyl group in its molecule as mentioned above with at least one molecule of a polyisocyanate at its isocyanate groups and further reacting the product with at least one molecule of a monomer having a group capable of reacting with the isocyanate group and a radiation-sensitive unsaturated double bond. For example, modified vinyl chloride-vinyl acetate copolymer resins having pendant acrylic double bonds are prepared by reacting a saponified vinyl chloride-vinyl acetate copolymer (e.g. VAOH manufactured by U.C.C.) with toluene diisocyanate in an amount of one molecule per hydroxyl group of the copolymer and then reacting the product with 2-hydroxyethyl methacrylate.

Examples of the polyisocyanate compounds used herein include 2,4-toluene diisocyanate, 2,6-toluene diisocyanate, 1,3-xylene diisocyanate, 1,4-xylene diisocyanate, m-phenylene diisocyanate, p-phenylene diisocyanate, hexamethylene diisocyanate, isopholone diisocyanate, Desmodur L and Desmodur IL (trade name, manufactured by Bayern A.G. of West Germany). Examples of the monomers having a group capable of reacting with isocyanate group and a radiation-sensitive unsaturated double bond include esters having a hydroxyl group such as 2-hydroxyethyl acrylate and methacrylate, 2-hydroxylpropyl acrylate and methacrylate, and 2-hydroxyoctyl acrylate and methacrylate; monomers having active hydrogen capable of reacting with isocyanate group and an acrylic double bond such as acrylamides, methacrylamides, and N-methylolacrylamides; polyhydric alcohol esters such as allyl alcohol-maleic acid ester; and monomers having active hydrogen capable of reacting with the isocyanate group and a radiation-sensitive unsaturated double bond such as mono- and di-glycerides of long chain fatty acids having an unsaturated double bond.

(B) Reaction products are also included which are prepared by reacting one molecule of a compound having at least one epoxy group in its molecule with at least one molecule of a monomer having a group capable of reacting with epoxy group and an electron radiation-sensitive unsaturated double bond. For example, resins, prepolymers and oligomers having a pendant acrylic double bond in their molecule are prepared by reacting acrylic acid with an epoxy-bearing thermoplastic resin resulting from radical polymerization of glycidyl methacrylate, thereby incorporating a pendant acrylic double bond into the molecule through ring-opening reaction between carboxyl and epoxy groups; similar resins, prepolymers and oligomers having a radiation-sensitive unsaturated double bond in their molecular backbone may be prepared by reacting maleic acid with a similar thermoplastic resin thereby effecting ring-opening reaction between carboxyl and epoxy groups.

The compounds having at least one epoxy group in their molecule are homopolymers and copolymers with other polymerizable monomers of epoxy-bearing acrylates and methacrylates such as glycidyl acrylate and glycidyl methacrylate, for example, Epikote 828, Epikote 1001, Epikote 1007, and Epikote 1009 (trade name, Shell Chemicals) as mentioned in (e) for the thermoplastic resins, and other types of epoxy resins. Examples of the monomers having a group capable of reacting with epoxy group and an electron radiation-sensitive unsaturated double bond include acrylic monomers having a carboxyl group such as acrylic acid and methacrylic acid, acrylic monomers having a primary or secondary amino group such as methylaminoethyl acrylate and methylaminoethyl methacrylate, and polybasic acid monomers having a radiation-sensitive unsaturated double bond such as maleic acid, fumaric acid, chrotonic acid, undecylenic acid, etc.

(C) Reaction products are also included which are prepared by reacting one molecule of a compound having at least one carboxyl group in its molecule with at least one molecule of a monomer having a group capable of reacting with carboxyl group and a radiation-sensitive unsaturated double bond. For example, resins, prepolymers and oligomers having an acrylic double bond in their molecule are prepared by reacting glycidyl methacrylate with a carboxyl-bearing thermoplastic resin resulting from solution polymerization of methacrylic acid, thereby incorporating an acrylic double bond into the molecule through ring-opening reaction between carboxyl and epoxy groups.

Examples of the compounds having at least one carboxyl group in their molecule include the foregoing polyesters having a carboxyl group in the backbone or at the terminal, and homopolymers and copolymers with other polymerizable monomers of monomers capable of radical polymerization and having a carboxyl group such as acrylic acid, methacrylic acid, maleic anhydride, and fumaric acid. The monomers having a group capable of reacting with carboxyl group and a radiation-sensitive unsaturated double bond are for example, glycidyl acrylate and glycidyl methacrylate.

The magnetic composition of magnetic particles in the resin blend may further contain a solvent for dispersion. The solvents may be ordinary solvents and diluents, for example, ketones such as acetone, methyl ethyl ketone (MEK), methyl isobutyl ketone (MIBK), and cyclohexanone, esters such as ethyl acetate and butyl acetate, alcohols which could not be used in heat curing of isocyanates such as methanol, ethanol, isopropanol, and butanol, ethers such as tetrahydrofuran and dioxane, dimethylformamide, vinyl pyrrolidone, and aromatic hydrocarbons such as toluene and xylene.

The magnetic layer which can be provided in the magnetic recording medium according to the present invention is a magnetic layer of coating type which is formed by coating a lacquer or dispersion of magnetic particles followed by drying. The magnetic particles may be gamma-iron trioxide ($\gamma$-$Fe_2O_3$), iron tetraoxide ($Fe_3O_4$), cobalt-doped $\gamma$-$Fe_2O_3$, cobalt-doped $\gamma$-$Fe_2O_3$-$Fe_3O_4$ solid solution, chromium dioxide ($CrO_2$), cobalt compound-carrying $\gamma$-$Fe_2O_3$ and cobalt compound-carrying $Fe_3O_4$ (including intermediate oxide forms between cobalt compound and $\gamma Fe_2O_3$); the term cobalt compound designates those cobalt compounds capable of utilizing the magnetic anisotropy of cobalt for improving coercive force, for example, cobalt oxide, cobalt hydroxide, cobalt ferrite, cobalt ion adsorbed materials and the like.), and ferromagnetic metals such as iron and cobalt alone and their combinations such as Fe-Co, Fe-Co-Ni, Co-Ni, etc., but not limited thereto. These magnetic layers may be formed by any desired one of conventional processes including a wet reduction process using a reducing agent such as $NaBH_4$, a dry reduction process of treating the surface of iron oxide with a silicon compound followed by reduction with hydrogen gas, and a vacuum deposition process of evaporating the magnetic particles in vacuum, that is, in an argon gas stream under a reduced pressure. Pulverized monocrystalline barium ferrite may also be used.

Finely divided magnetic materials may be used in needle or round form depending on the particular magnetic recording medium to which they are applied.

For high-bias hi-fi audio cassette tapes, video cassette tapes, video tape contact-transfer printing master tapes which are experiencing a remarkable technical advance and facing a continuously spreading market, combinations of the radiation-curable or radiation-sensitive polymerizable binder according to the present invention with the magnetic fine powder, particularly cobalt-modified needle iron oxide effective in high density recording application (cobalt-doped type and cobalt compound-bearing type) or needle alloy fine particles having a high coercive force provide high performance tape having improved electromagnetic properties and reliable physical properties.

The radiation-sensitive binder compounds for magnetic recording media according to the present invention may further contain any suitable additives commonly used in the art, for example, antistatic agents, lubricants, dispersants, and coat reinforcing agents.

The active energy radiation which can be used to initiate the crosslinking of the coating composition may include electron rays emitted by means of radiation accelerators, gamma-rays emitted using $Co^{60}$ as a source, beta-rays emitted using $Sr^{90}$ as a source, X-rays emitted by means of X-ray generators, and ultraviolet radiation.

Radiation emitted by means of a radiation accelerator may preferably be used from points of view of control of the dose of radiation absorbed, matching with a manufacture line, shield of electromagnetic waves, and the like.

The preferred way of applying radiation for curing of the coating compositions is to emit radiation by means of a radiation accelerator having an accelerating voltage of 100 to 750 kilovolts, and preferably 150 to 300 kilovolts so as to provide a dose of radiation absorbed of 0.5 to 20 megarad.

In curing the coating compositions, a radiation accelerator of low dose type manufactured by Energy Science Company (U.S.) and known as an electrocurtain system, an accelerator manufactured by RP Company, and similar accelerators are particularly advantageously used because they are easy to incorporate in the existing tape coating line and to shield secondary-X-rays in the interior thereof. Of course, Van de Graaff accelerators which have been widely used as radiation accelerators may also be used.

In carrying out radiation crosslinking, it is important in most cases to expose the coating compositions to radiation in a stream of an inert gas such as nitrogen gas and helium gas. Exposure to radiation in air will generate ozone ($O_3$) and other active substances which adversely affect crosslinking reaction, that is, prevent radicals generated in the base resin or binder from efficiently undergoing crosslinking reaction. Such undesirable substances can penetrate into the interior of the coated film because of its porous nature where the binder crosslinking is then prohibited. The atmosphere where active energy beams are applied should preferably be an atmosphere of an inert gas such as nitrogen ($N_2$), helium (He) and carbon dioxide ($CO_2$) containing less than about 1% by volume of oxygen.

A magnetic composition is prepared by blending a radiation-sensitive modified resin with a radiation-sensitive modified flexible resin or prepolymer, oligomer or telomer thereof, plasticizing the blend to form a binder compound, and adding ferromagnetic fine particles to the binder compound. The magnetic composition may be applied onto the plasma treated surface of a base film with or without an undercoat layer and then exposed to radiation for crosslinking and polymerization so that the magnetic composition is cured to the base film.

The undercoat layer may be formed from metals such as aluminum, copper, titanium and chromium or alloys thereof by ion-plating, vacuum deposition, sputtering or any other metallizing techniques. Instead, a resin which may contain fine particles may be coated to form the undercoat layer.

The magnetic recording media of the present invention may find a variety of applications.

The magnetic recording media have substantially improved durability because the base films are plasma treated in a treating gas having a controlled partial pressure of oxygen at a frequency in the specific range. Particularly, still life and runnability are outstandingly improved. The bond strength of magnetic layer to base film is significantly increased without regard to whether an undercoat layer is interposed therebetween.

The magnetic recording media of the present invention are prepared by treating a base film with a plasma, preparing a plasticized binder compound of a radiation-sensitive modified resin in admixture with a radiation-sensitive modified flexible resin or prepolymer, oligomer, or telomer, incorporating ferromagnetic fine particles to the binder compound, applying the resulting magnetic composition or lacquer to the plasma-treated base film, and exposing the applied composition to radiation for crosslinking and polymerization. This process offers the following advantages.

(A) The magnetic composition or lacquer and the magnetic film as coated to the base film are chemically and physically very stable so that no particular limitation is imposed to the pot life of the magnetic lacquer and the processing of the as-coated magnetic film, for example, surface smoothening, until exposure to radiation. Thus necessary treatments may be carried out before radiation exposure, desirably allowing for an efficient automatic manufacturing line and quality control.

(B) The crosslinking and polymerization to dryness of the binder compound according to the present invention is accomplished by generating radicals in the binder upon exposure to radiation which instantaneously perform crosslinking and polymerization.

The dose necessary to generate radicals is given by applying radiation of the order of 20 Mrad at the maximum for a very short time without causing thermal deformation to polyester films commonly used as the substrate. Irradiation may be effected on line in a continuous sheet processing system. This eliminates the problems associated with subseqent heat curing in the case of thermosetting resins that during thermosetting of a roll of coated tape, interlayer transition would occur between non-uniform magnetic layers to reduce the yield and tightening and transfer of irregularities on the back surface of the base film to the magnetic layer would occur resulting in a reduced S/N ratio in a shorter wavelength band.

(C) Contrary to thermosetting chemical reaction in the prior art which takes a relatively long time to complete the reaction, the reaction is radical reaction as already described in (B). The degree of crosslinking and the degree of dryness by polymerization can be readily controlled by adjusting the dose of radiation, eliminating such troubles as tacky adhesion due to low molecular weight components oozing out of the magnetic layer. The use of radiation-curable magnetic compositions eliminates the application of heat energy as required in thermosetting process, contributing to energy saving.

EXAMPLES

Examples of the present invention are presented below together with control, comparative examples and experiments. These examples are to be construed as illustrating the present invention and not limiting the present invention.

(1) Base film treatment

Plasma treatment 1

A polyethylene terephthalate (PET) base film of 10 μm thick was plasma treated using argon, oxygen and mixtures thereof as the treating gas. The plasma treating conditions are as follows.
Gas flow rate: 100 ml/minute fixed for Ar and $O_2$ alone and mixtures of Ar and $O_2$
Vacuum: 0.5 Torr
Frequency: DC, AC 60 Hz - 2.45 GHz
Power: 200 Watts
Base film transfer rate: 30 m/minute Plasma treatment 2 The procedure of plasma treatment 1 was repeated except that the treating gas was nitrogen ($N_2$).

Comparative treatment A polyester base film of 10 μm thick was treated with a corona discharge. The corona discharge treatment was carried out in a corona discharge machine P-500VA (manufactured by Pyra Co.) operating at a voltage of 200 volts while the base film was transferred at a speed of 30 m/minute.

(2) Magnetic layer

The magnetic layer was formed by applying a magnetic composition which was prepared from the following formulation.

Magnetic layer 1

| Ingredients | Parts by weight |
| --- | --- |
| Cobalt-carrying needle-γ-$Fe_2O_3$ (major axis 0.4 μm, minor axis 0.05 μm Hc 600 Oe) | 120 |
| Carbon black* | 5 |
| α-$Al_2O_3$ powder (particle size 0.5 μm) | 2 |
| Dispersant (lecithin from soybean oil) | 3 |
| Solvent (50/50 MEK/toluene) | 100 |

*antistatic agent, Mitsubishi Carbon Black MA-600 manufactured by Mitsubishi Chemicals K.K.

The ingredients were mixed for 3 hours in a ball mill to thoroughly wet the magnetic needle iron trioxide with the dispersant.

Separately, the following ingredients were thoroughly mixed into a binder solution.

| Ingredients | Parts by weight |
| --- | --- |
| Saturated polyester resin having acrylic double bond incorporated (c) | 10 (solids) |
| Vinyl chloride-vinyl acetate copolymer having acrylic double bond incorporated (a) | 10 (solids) |
| Polyether urethane elastomer having acrylic double bond incorporated (f) | 10 (solids) |
| Solvent (50/50 MEK/toluene) | 200 |
| Lubricant (higher fatty acid modified silicone oil) | 3 |

The binder solution was added to the ball mill containing the magnetic particle mixture and mixed for further 42 hours for dispersion.

The thus obtained magnetic lacquer was applied onto the plasma treated polyester film of 10 μm thick, oriented under the influence of a permanent magnet (1600 Gauss), dried under an infrared radiation lamp or hot air blow to remove the solvent, subjected to a surface smoothening treatment, and thereafter cured by exposing to electron radiation in a nitrogen atmosphere using an electro-curtain type electron radiation accelerator (manufactured by E.S.I.) under conditions: accelerating voltage 150 keV, electrode current 20 mA, and total dose 10 Mrad.

The thus obtained web was cut into video tapes of ½ inches wide.

Due to the preparation process, the magnetic coating of this example is believed to be cured through both crosslinking by radicals resulting from acrylic double bonds and crosslinking by radicals created in the vinyl chloride-vinyl acetate molecule chain.

Magnetic layer 2

| Ingredients | Parts by weight |
| --- | --- |
| Needle iron alloy (major axis 0.3 μm, minor axis 0.04 μm, Hc 1100 Oe) | 120 |
| Dispersant (oleic acid) | 2 |
| Solvent (50/50 MEK/toluene) | 100 |

The ingredients were mixed for 3 hours in an intensive mill to thoroughly wet the magnetic needle iron alloy with the dispersant.

Separately, the following ingredients were thoroughly mixed into a binder solution.

| Ingredients | Parts by weight |
| --- | --- |
| Butyral resin having acrylic double bond incorporated | 18 (solids) |
| Urethane elastomer having acrylic double bond incorporated | 12 (solids) |
| Solvent (50/50 MEK/toluene) | 200 |
| Lubricant (higher fatty acid) | 3 |

The binder solution was mixed with the magnetic particle mixture in a high speed mixer for 1 hour and further milled for 4 hours in a sand grind mill for dispersion.

The thus obtained magnetic lacquer was applied onto the plasma treated polyester film of 10 μm thick, oriented under the influence of a permanent magnet (1600 Gauss), dried under an infrared radiation lamp or hot air blow to remove the solvent, subjected to a surface smoothening treatment, and thereafter cured by exposing to electron radiation in a nitrogen atmosphere using an electro-curtain type electron radiation accelerator under conditions: accelerating voltage 150 keV, electrode current 20 mA, and total dose 5 Mrad.

Magnetic layer 3

| Ingredients | Parts by weight |
| --- | --- |
| γ-Fe$_2$O$_3$ (major axis 0.8 μm, minor axis 0.2 μm, Hc 300 Oe) | 120 |
| Carbon black* | 5 |
| α-Al$_2$O$_3$ powder (particle size 0.5 μm) | 2 |
| Dispersant (sorbitan monooleate) | 3 |
| Solvent (50/50 MEK/toluene) | 100 |

*antistatic agent, Mitsubishi Carbon Black MA-600 manufactured by Mitsubishi Chemicals K.K.

The ingredients were mixed for 3 hours in a ball mill to thoroughly wet the magnetic needle iron trioxide with the dispersant.

Separately, the following ingredients were thoroughly mixed into a binder solution.

| Ingredients | Parts by weight |
| --- | --- |
| Epoxy resin having acrylic double bond incorporated | 15 (solids) |
| Polybutadiene elastomer having acrylic double bond incorporated | 15 (solids) |
| Solvent (50/50 MEK/toluene) | 200 |
| Lubricant (fluorine oil, Krytocks manufactured by duPont)) | 3 |

The binder solution was added to the ball mill containing the magnetic particle mixture and mixed for further 42 hours for dispersion.

The thus obtained magnetic lacquer was applied onto the plasma treated polyester film, oriented under the influence of a permanent magnet (1600 Gauss), dried under an infrared radiation lamp or hot air blow to remove the solvent, subjected to a surface smoothening treatment, and thereafter cured by exposing to electron radiation in a nitrogen atmosphere using an electro-curtain type electron radiation accelerator under conditions: accelerating voltage 175 keV, electrode current 15 mA, and total dose 2 Mrad.

Magnetic layer 4

| Ingredients | Parts by weight |
| --- | --- |
| γ-Fe$_2$O$_3$ (major axis 0.8 μm, minor axis 0.2 μm, Hc 300 Oe) | 120 |
| Carbon black* | 5 |
| α-Al$_2$O$_3$ powder (particle size 0.5 μm) | 2 |
| Dispersant (polyoxyethylene alkyl phenol phosphate) | 3 |
| Solvent (50/50 MEK/toluene) | 100 |

*antistatic agent, Mitsubishi Carbon Black MA-600 manufactured by Mitsubishi Chemicals K.K.

The ingredients were mixed for 3 hours in a ball mill to thoroughly wet the magnetic needle iron trioxide with the dispersant.

Separately, the following ingredients were thoroughly mixed into a binder solution.

| Ingredients | Parts by weight |
| --- | --- |
| Methacrylate resin having allyl group incorporated | 15 (solids) |
| Internally plasticized unsaturated polyester resin | 15 (solids) |
| Solvent (50/50 MEK/toluene) | 200 |
| Lubricant (fatty acid modified siloxane) | 3 |

The binder solution was added to the ball mill containing the magnetic particle mixture and mixed for further 42 hours for dispersion.

The thus obtained magnetic lacquer was applied onto the plasma treated polyester film, oriented under the influence of a permanent magnet (1600 Gauss), dried under an infrared radiation lamp or hot air blow to remove the solvent, subjected to a surface smoothening treatment, and thereafter cured by exposing to electron radiation in a carbon dioxide atmosphere using an electro-curtain type electron radiation accelerator under conditions: accelerating voltage 175 keV, electrode current 15 mA, and total dose 2 Mrad.

Magnetic layer 5 (Comparison)

| Ingredients | Parts by weight |
| --- | --- |
| Cobalt-carrying needle-γ-Fe$_2$O$_3$ (major axis 0.4 μm, minor axis 0.05 μm Hc 600 Oe) | 120 |
| Carbon black* | 5 |
| α-Al$_2$O$_3$ powder (particle size 0.5 μm) | 2 |
| Dispersant (lecithin from soybean oil) | 3 |
| Solvent (50/50 MEK/toluene) | 100 |

*antistatic agent, Mitsubishi Carbon Black MA-600 manufactured by Mitsubishi Chemicals K.K.

The ingredients were mixed for 3 hours in a ball mill to thoroughly wet the magnetic needle iron trioxide with the dispersant.

Separately, the following ingredients were thoroughly mixed into a binder solution.

| Ingredients | Parts by weight |
| --- | --- |
| Vinyl chloride-vinyl acetate copolymer (VAGH, manufactured by U.C.C.) | 15 |
| Thermoplastic urethane (Nippolan 3022, manufactured by Nihon Polyurethane K.K.) | 15 (solids) |
| Solvent (50/50 MEK/toluene) | 200 |
| Lubricant (higher fatty acid modified silicone oil) | 3 |

The binder solution was added to the ball mill containing the magnetic particle mixture and mixed for further 42 hours for dispersion. At the end of dispersion, 5 parts by weight (calculated as solids) of an isocyanate compound capable of reacting with functional groups, primarily hydroxyl groups of the binders in the magnetic lacquer for crosslinking, that is, Desmodur L (manufactured by Bayern A.G.) was added to the magnetic lacquer in the ball mill and mixed for further 20 minutes.

The thus obtained magnetic lacquer was applied onto the plasma treated polyester film of 10 μm thick, oriented under the influence of a permanent magnet (1600 Gauss), dried under an infrared radiation lamp or hot air blow to remove the solvent, and subjected to a surface smoothening treatment. Thereafter the roll of web was placed in an oven at 80° C. for 48 hours to promote the crosslinking reaction by the isocyanate.

The thus obtained web was cut into video tapes of ½ inches wide.

Magnetic layer 6 (Comparison)

| Ingredients | Parts by weight |
| --- | --- |
| Needle iron alloy (major axis 0.3 μm, minor axis 0.04 μm, Hc 1100 Oe) | 120 |

-continued

| Ingredients | Parts by weight |
| --- | --- |
| Dispersant (oleic acid) | 2 |
| Solvent (50/50 MEK/toluene) | 100 |

The ingredients were mixed for 3 hours in an intensive mill to thoroughly wet the magnetic needle iron alloy with the dispersant.

Separately, the following ingredients were thoroughly mixed into a binder solution.

| Ingredients | Parts by weight |
| --- | --- |
| Polyvinyl butyral resin (BMS, manufactured by Sekisui Chemical K.K.) | 15 |
| Thermoplastic urethane (Estan 5715, manufactured by B. F. Goodrich) | 15 |
| Solvent (MEK) | 200 |
| Lubricant (higher fatty acid modified silicone oil) | 3 |

The binder solution was mixed with the magnetic particle mixture in a high speed mixer for 1 hour and further milled for 4 hours in a sand grind mill for dispersion. At the end of dispersion, 5 parts by weight (calculated as solids) of an isocyanate compound capable of reacting with functional groups, primarily hydroxyl groups of the binders in the magnetic lacquer for cross-linking, that is, Desmodur L (manufactured by Bayern A.G.) was added to the magnetic lacquer in the sand mill and mixed for further 20 minutes.

The thus obtained magnetic lacquer was applied onto the plasma treated polyester film of 10 μm thick, oriented under the influence of a permanent magnet (1600 Gauss), dried under an infrared radiation lamp or hot air blow to remove the solvent, and subjected to a surface smoothening treatment. Thereafter the film was placed in an oven at 80° C. for 48 hours for thermosetting.

Magnetic layer 7 (Comparison)

A magnetic layer was formed on the base film by coating the following composition.

| Composition | Parts by weight |
| --- | --- |
| Fe—Co alloy powder | 100 |
| Abrasive (Al$_2$O$_3$) | 3 |
| Nitrocellulose | 6 |
| Epoxy resin (Epikote ® 1004) | 4 |
| Polyurethane (Nippolan ® 5033) | 10 |
| Solvent | 250 |

The composition was milled for dispersion for 5 hours in a sand mill, to which 4 parts by weight of an isocyanate (Colonate L) was added. The composition was coated by a conventional coating technique onto a 10 μm thick polyester base film which had been plasma treated in the same manner as above while magnetic orientation was effected.

EXPERIMENT 1

Samples prepared in Examples using magnetic layer 3 were subjected to the following tests.

A. Bond strength

A adhesive tape was attached to the magnetic layer of each tape sample having a width of ¼ inch under a direction at an angle of 180° with respect to the original surface at a given rate. The force required to peel off the adhesive tape was measured.

B. Still life

A commercially available VTR equipment was loaded with a tape and operated in a still mode to continuously reproduce a still image until the still image disappeared. Still life is a period of time during which the still image was being reproduced.

C. Contact angle

Using a contact angle meter of CA-P type (manufactured by Kyowa Chemical K.K., Japan), the contact angle was measured by the water drop projection method.

Base films were subjected to 100 kHz plasma treatment, RF plasma treatment, microwave plasma treatment, and corona treatment in atmospheres having varying contents of oxygen. Magnetic layer 3 was coated on these base films and cured with radiation by the procedure as previously described. The resulting tape samples were measured for bond strength. The results are plotted in FIG. 2. The symbols used in FIG. 2 have the following correspondence.

| Symbol | Treatment |
| --- | --- |
| ● | 100 kHz plasma |
| O | RF (13.56 MHz) plasma |
| X | Microwave (2.45 GHz) plasma |
| Δ | Corona |

The latter three, RF, microwave, and corona treatments are for comparison purposes. The microwave plasma treatment was carried out in a conventional manner.

Figure 3:
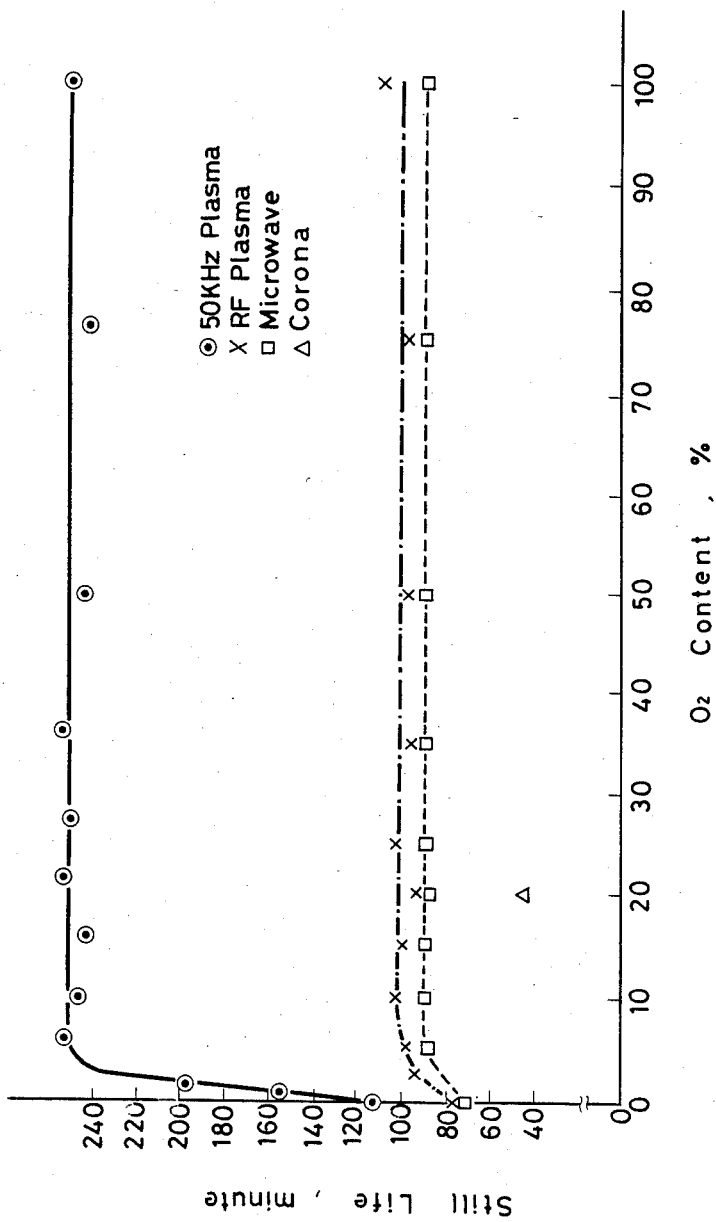
FIG. 3 is a diagram showing the still life of magnetic tapes as a function of oxygen contents in the treating gas.

The still life of the tape samples is plotted in the diagram of FIG. 3 as a function of oxygen contents in the atmosphere. The symbols used in FIG. 3 have the following correspondence.

| Symbol | Treatment |
| --- | --- |
| ⊙ | 50 kHz plasma |
| X | RF plasma |
| □ | Microwave plasma |
| Δ | Corona treatment |

Figure 2:
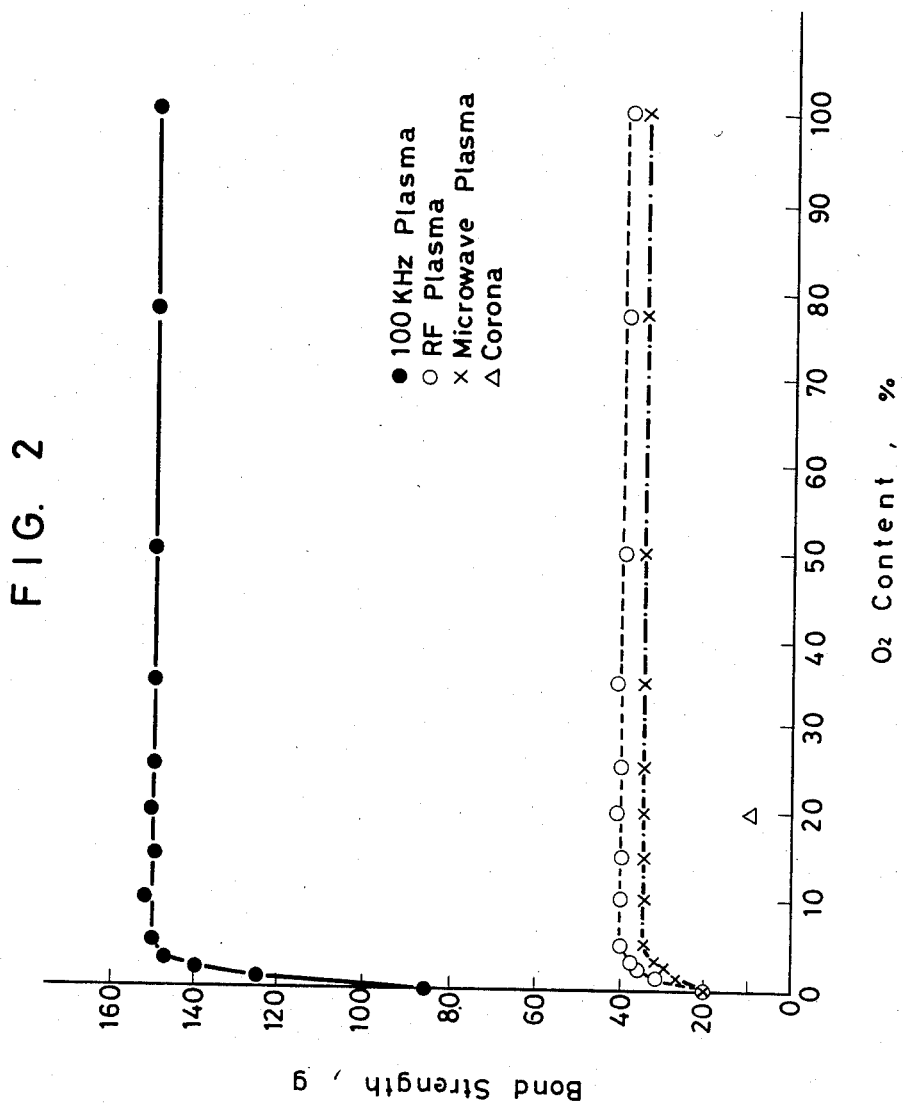
FIG. 2 is a diagram showing the bond strength of magnetic layers to base films treated according to the present invention and by the prior art technique as a function of oxygen contents in the treating gas.

As seen from FIGS. 2 and 3, significant improvements in bond strength and still life are observable when plasma treatment is effected at frequencies of 10 to 200 kHz in an atmosphere having an oxygen content of 5% or more.

Figure 4:
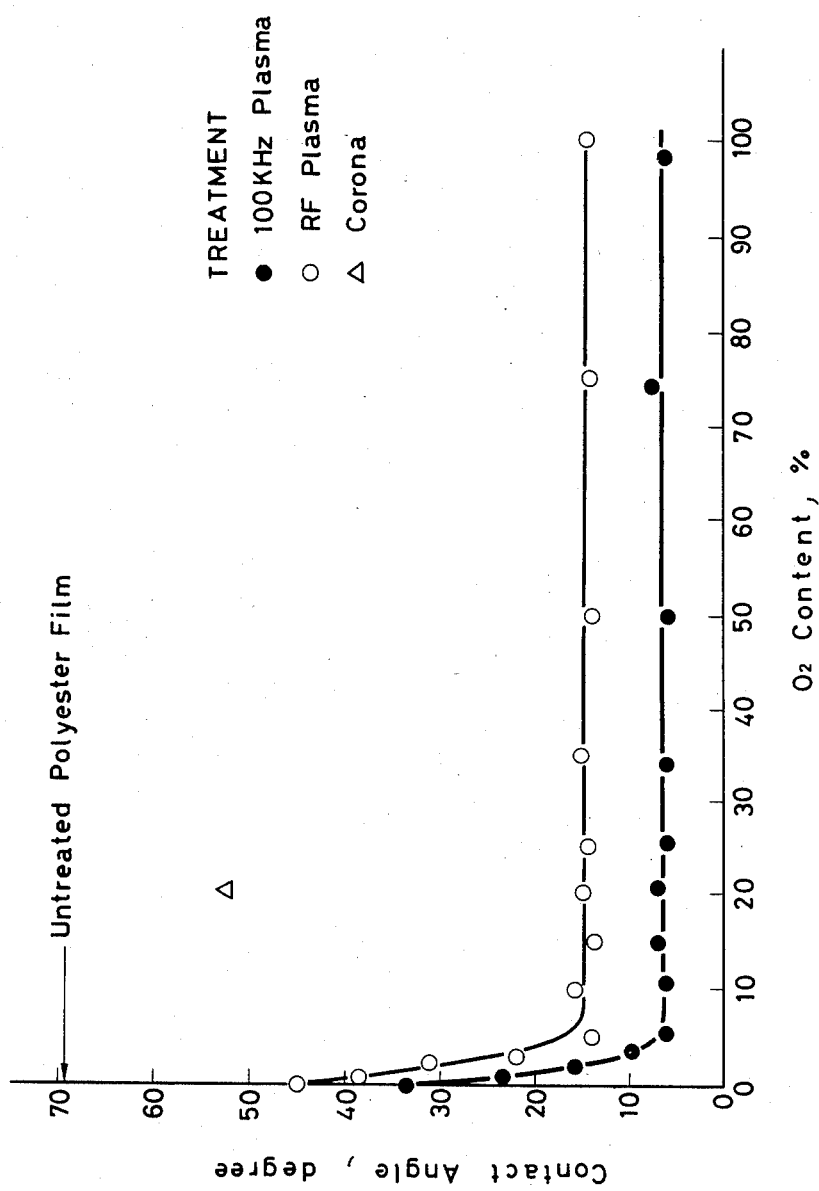
FIG. 4 is a diagram showing the contact angle of treated base films as a function of oxygen contents in the treating gas.

To investigate why such improvements were achieved, the contact angle of plasma-treated polyester films was measured. The results are plotted in FIG. 4. The symbols used in FIG. 4 have the following correspondence.

| Symbol | Treatment |
| --- | --- |
| ● | 100 kHz plasma |
| O | RF (13.56 MHz) plasma |
| Δ | Corona |

Further, the film surface was analyzed by the ESCA (electron spectroscopy for chemical analysis) to find that the peaks at 289 and 286.4 eV attributable to C=O and C—O— of the carbons of polyethylene terephthalate, respectively, are increased and the peak at 285 eV attributable to the benzene ring is decreased. This suggests that carbonyl and/or ether groups are newly created in the benzene rings of polyethylene terephthalate. This tendency is more remarkable at oxygen contents in the atmosphere of 5% or more and at frequencies of 10 to 200 kHz. It is thus believed that when the oxygen content of the atmosphere exceeds 5% by volume in the plasma treatment at frequencies of 10 to 200 kHz, functional groups are formed to a great extent such as to reduce the contact angle, providing a more wettable surface. In addition, the plasma treatment functions to clean the film surface to remove a weak boundary layer (WBL). These effects are reponsible to significant improvements in bond strength and still life.

Figure 5:
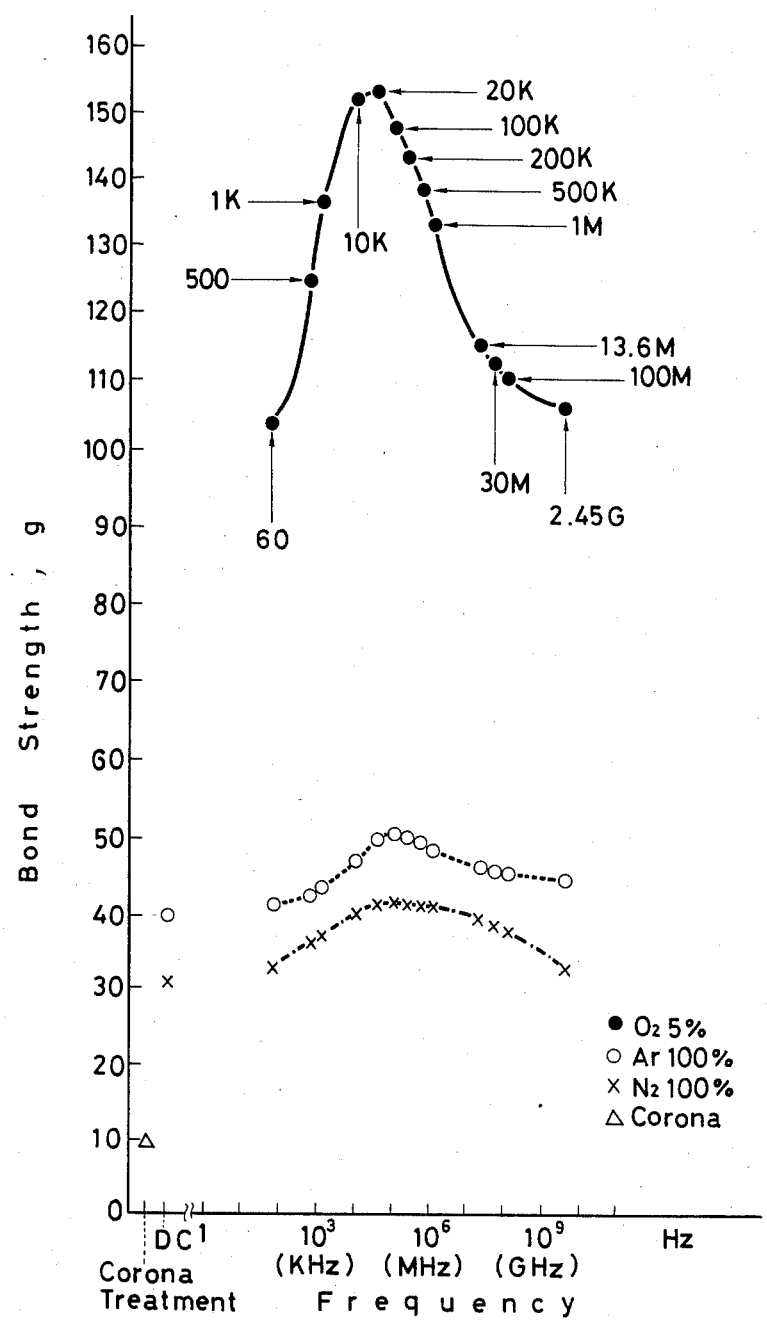
FIG. 5 is a diagram showing the bond strength of magnetic layer to base film as a function of plasma frequencies.

FIG. 5 shows the bond strength of magnetic layer to base film as a function of frequencies. Symbols used in FIG. 5 have the following correspondence.

| Symbol | Plasma |
|---|---|
| ● | 5% $O_2$-95% Ar |
| O | 100% Ar |
| X | 100% $N_2$ |
| △ | corona |

Figure 6:
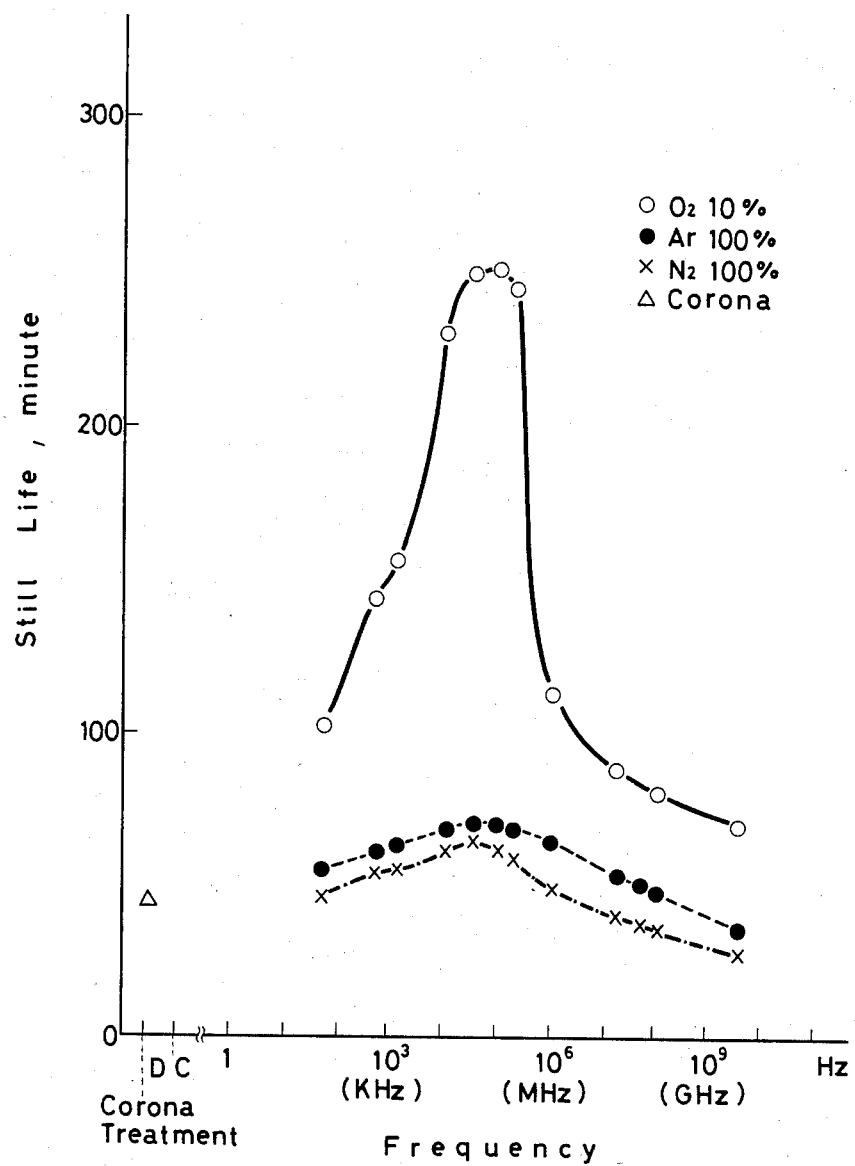
FIG. 6 is a diagram showing the still life of magnetic tapes as a function of plasma frequencies.

The still life of the tapes is plotted as a function of frequencies in the diagram of FIG. 6, The symbols used in FIG. 6 have following correspondence.

| Symbol | Plasma |
|---|---|
| O | 10% $O_2$-90% Ar |
| ● | 100% Ar |
| X | 100% $N_2$ |
| △ | Corona |

As seen from the data in FIGS. 5 and 6, magnetic recording media having enhanced bond strength and extended still life can be produced using polyester base films which has been plasma treated at frequencies in the range of 10 to 200 kHz in an atmosphere having an adequate content of oxygen.

To examine why such improvements are achieved, the plasma treated polyester base films were measured for contact angle. It was found that the plasma treated films possess a drastically reduced contact angle and hence, improved wettability at the surface which in turn, contributes to improvements in bond strength and still life in cooperation with the surface cleaning effect of plasma treatment.

Experiment 2

Base films were treated by various plasma and corona techniques. Various magnetic layers were formed on the treated base films. The thus obtained tape samples were measured for bond strength, contact angle, and still life. The results are shown in Table 1.

TABLE 1

| Sample No. | Base film treatment | Magnetic layer | Bond strength, g | Still life, min. |
|---|---|---|---|---|
| 1 | 100 kHz plasma $O_2$ 10% + Ar | 1 | 150 | >240 |
| 2 | 100 kHz plasma $N_2$ | 1 | 40 | 60 |
| 3 | RF plasma $O_2$ 10% + Ar | 1 | 30 | 100 |
| 4 | Corona | 1 | 10 | 40 |
| 5 | 100 kHz plasma $O_2$ (10%) + Ar | 2 | 120 | >240 |
| 6 | RF plasma $N_2$ | 2 | 30 | 60 |
| 7 | 50 kHz plasma $O_2$ 50% + Ar | 3 | 130 | >240 |
| 8 | 50 kHz plasma Ar | 3 | 40 | 70 |
| 9 | Microwave plasma $O_2$ 10% + Ar | 3 | 50 | 75 |
| 10 | 50 kHz plasma $O_2$ | 4 | 180 | >240 |
| 11 | 60 Hz plasma $O_2$ | 4 | 60 | 65 |
| 12 | Corona | 4 | 20 | 70 |
| 13 | 100 kHz plasma $O_2$ | 5 | 45 | 100 |
| 14 | RF plasma $O_2$ | 5 | 30 | 65 |
| 15 | 100 kHz plasma $O_2$ 25% + Ar | 6 | 50 | 95 |
| 16 | 100 kHz plasma $O_2$ 25% + Ar | 7 | 55 | 90 |

As described in the foregoing, the present invention provides an improvement in magnetic recording media which are increasingly required to be of greater quality and durability by combining the treatment of base films at their surface with a plasma at frequencies in the specified range of 10 to 200 kHz in an inorganic gas and preferably, in an oxygen-containing inorganic gas atmosphere with the magnetic composition of ferromagnetic particles in a radiation-sensitive resin binder.

What is claimed is:

1. A magnetic recording medium comprising
   a base film which has been plasma treated at a frequency in the range of 10 to 200 kilohertz, and
   a magnetic layer formed thereon from a magnetic composition comprising ferromagnetic fine particles and a plasticized binder compound comprising a radiation-sensitive modified resin in admixture with a radiation-sensitive modified flexible resin or prepolymer, oligomer or telomer thereof, said composition being crosslinked and polymerized by exposure to radiation.

2. A magnetic recording medium according to claim 1 wherein the base film is plasma treated at a frequency in the range of 10 to 200 kilohertz in an atmosphere comprising an inorganic gas containing oxygen.

3. A magnetic recording medium according to claim 2 wherein the inorganic gas contains 5 to 100% by volume of oxygen.

4. A magnetic recording medium according to claim 3 which further comprises an undercoat layer formed between the base film and the magnetic layer.

5. A magnetic recording medium according to claim 1 wherein the radiation-sensitive modified resin has at least one radiation-sensitive unsaturated double bond selected from acrylic, maleic and allylic double bonds.

6. A magnetic recording medium according to claim 1 wherein the radiation-sensitive modified flexible resin or prepolymer, oligomer or telomer thereof has at least one radiation-sensitive unsaturated double bond selected from acrylic, maleic and allylic double bonds.

7. The magnetic recording medium according to claim 1 wherein the radiation-sensitive modified flexible resin or prepolymer, oligomer or telomer thereof has a dynamic modulus of lower than $1 \times 10^9$ dyn/cm$^2$ as measured in a temperature range from 20° C. to 60° C. at a frequency of 100 Hz.

* * * * *